United States Patent
Ward et al.

(10) Patent No.: US 9,912,939 B2
(45) Date of Patent: *Mar. 6, 2018

(54) PROJECTION DISPLAY PROVIDING ADDITIONAL MODULATION AND RELATED METHODS

(71) Applicant: Dolby Laboratories Licensing Corporation, San Francisco, CA (US)

(72) Inventors: Gregory John Ward, Berkeley, CA (US); Robin Atkins, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,562

(22) Filed: Mar. 7, 2017

(65) Prior Publication Data

US 2017/0180719 A1    Jun. 22, 2017

Related U.S. Application Data

(63) Continuation of application No. 14/950,010, filed on Nov. 24, 2015, now Pat. No. 9,626,921, which is a
(Continued)

(51) Int. Cl.
*H04N 13/04*   (2006.01)
*H04N 9/31*    (2006.01)
*G02F 1/1333*  (2006.01)

(52) U.S. Cl.
CPC ....... *H04N 13/0459* (2013.01); *G02F 1/1333* (2013.01); *H04N 9/3126* (2013.01);
(Continued)

(58) Field of Classification Search
CPC .. H04N 9/3197; H04N 5/7416; H04N 9/3108; H04N 9/3105
See application file for complete search history.

(56) References Cited

U.S. PATENT DOCUMENTS 4,792,850 A    12/1988   Lipton
5,481,321 A    1/1996    Lipton
(Continued)

FOREIGN PATENT DOCUMENTS

JP    2005-283827    10/2005
JP    4407345        2/2010
(Continued)

OTHER PUBLICATIONS

Kusakabe, Y., et al., "A YC-Separation-Type Projector: High Dynamic Range with Double Modulation" Journal of the SID, 2008, pp. 383-391.
(Continued)

*Primary Examiner* — Ricardo L Osorio (57) ABSTRACT

A projection display system includes a spatial modulator that is controlled to compensate for flare in a lens of the projector. The spatial modulator increases achievable intra-frame contrast and facilitates increased peak luminance without unacceptable black levels. Some embodiments provide 3D projection systems in which the spatial modulator is combined with a polarization control panel.

20 Claims, 3 Drawing Sheets

Related U.S. Application Data continuation of application No. 13/409,425, filed on Mar. 1, 2012, now Pat. No. 9,224,320.

(60) Provisional application No. 61/450,750, filed on Mar. 9, 2011.

(52) U.S. Cl.
CPC ..... H04N 13/0434 (2013.01); H04N 13/0497 (2013.01); *G02F 2203/50* (2013.01)

(56) References Cited

U.S. PATENT DOCUMENTS

| | | | |
|---|---|---|---|
| 6,727,864 | B1 | 4/2004 | Johnson |
| 6,804,406 | B1 | 10/2004 | Chen |
| 7,018,046 | B2 | 3/2006 | Childers |
| 7,173,766 | B2 | 2/2007 | Kimura |
| 7,551,341 | B1 | 6/2009 | Ward |
| 7,753,530 | B2 | 7/2010 | Whitehead |
| 8,019,390 | B2 | 9/2011 | Sindhu |
| 8,125,425 | B2 | 2/2012 | Seetzen |
| 8,199,401 | B2 | 6/2012 | Ninan |
| 8,446,351 | B2 | 5/2013 | Whitehead |
| 9,076,391 | B2 | 7/2015 | Johnson |
| 9,626,921 | B2 * | 4/2017 | Ward ................. G09G 3/3611 |
| 2006/0018025 | A1 | 1/2006 | Sharon |
| 2007/0091434 | A1 | 4/2007 | Garner |
| 2010/0007577 | A1 | 1/2010 | Ninan |
| 2011/0032345 | A1 | 2/2011 | Robinson |
| 2011/0261048 | A1 | 10/2011 | Lee |
| 2012/0036485 | A1 | 2/2012 | Watkins, Jr. |
| 2012/0062848 | A1 | 3/2012 | Koyanagi |
| 2012/0092360 | A1 | 4/2012 | Kang |
| 2012/0268391 | A1 | 10/2012 | Somers |
| 2013/0201303 | A1 | 8/2013 | Shimotani |

FOREIGN PATENT DOCUMENTS

| | | |
|---|---|---|
| WO | 2006/010244 | 2/2006 |
| WO | 2011/103083 | 8/2011 |
| WO | 2012/030526 | 3/2012 |

OTHER PUBLICATIONS

Pavlovych A., et al., "A High-Dynamic Range Projection System" 2006.

* cited by examiner

PROJECTION DISPLAY PROVIDING ADDITIONAL MODULATION AND RELATED METHODS

TECHNICAL FIELD

This invention relates to displays. The invention relates specifically to projection displays in which projectors project images onto screens for viewing.

BACKGROUND

Most digital projector systems (DLP, LCOS) have low intra-frame contrast ratios on the order of 100:1 when imaging a reflective screen. This is mostly due to flare in the optics (lenses), which scatters light and hence reduces contrast. The human visual system is capable of appreciating closer to 10,000:1 intra-frame contrast ratios, so there is vast room for improvement in digital projection technology.

Furthermore, the peak luminance of digital projectors is often limited to undesirably low levels (e.g. 50 cd/m$^2$) since, due to the low contrast ratios, black levels would be raised objectionably if maximum luminance were increased. For example, with a peak luminance of 50 cd/m$^2$ at a contrast ratio of 100:1, the black levels are 0.5 cd/m$^2$. If the projector peak luminance were increased to 500 cd/m$^2$, the black levels would rise to 5 cd/m$^2$, which viewers would perceive as distinctly grey.

Some displays are 3D displays capable of providing separate images for viewing by viewers' left and right eyes. Maintaining brightness in 3D displays is a particular problem since the polarizers, filters and/or shutters used to control which eye can see each image tend to absorb at least some light.

There is a need for projection display systems capable of improved intra-frame contrast. Included in such need is a need for more effective 3D projection display systems.

SUMMARY

This invention has a range of aspects. One aspect provides projection display systems that incorporate spatial modulators between a projector lens and a screen. The screen is a reflective screen in some embodiments. Another aspect provides methods for controlling a projection display system which methods comprise controlling the transmissivity of regions in a spatial modulator to compensate for lens flare in a projection lens of the projection display system. Another aspect provides a controller for a projection display system that is configured to control the transmissivity of regions in a spatial modulator to compensate for lens flare in a projection lens of the projection display system. In some embodiments the projection display system is a polarizing type 3D display system comprising a polarization control panel. In some embodiments the polarization control panel and spatial modulator are integrated in a single unit.

An example aspect provides a projection display system comprising a projector comprising a projection lens arranged to focus an image from the projector onto a screen. a spatial modulator is disposed between the projection lens and the screen. A controller is connected to control transmissivity of a plurality of regions of the spatial modulator based directly or indirectly on image data.

Further aspects of the invention and features of a variety of non-limiting example embodiments are described below and illustrated in the accompanying drawings.

BRIEF DESCRIPTION OF THE DRAWINGS

The accompanying drawings illustrate non-limiting example embodiments.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Providing a projection display having an increased contrast ratio can allow higher peak luminances without raising the black levels, and hence provide a better viewing experience.

Figure 1:
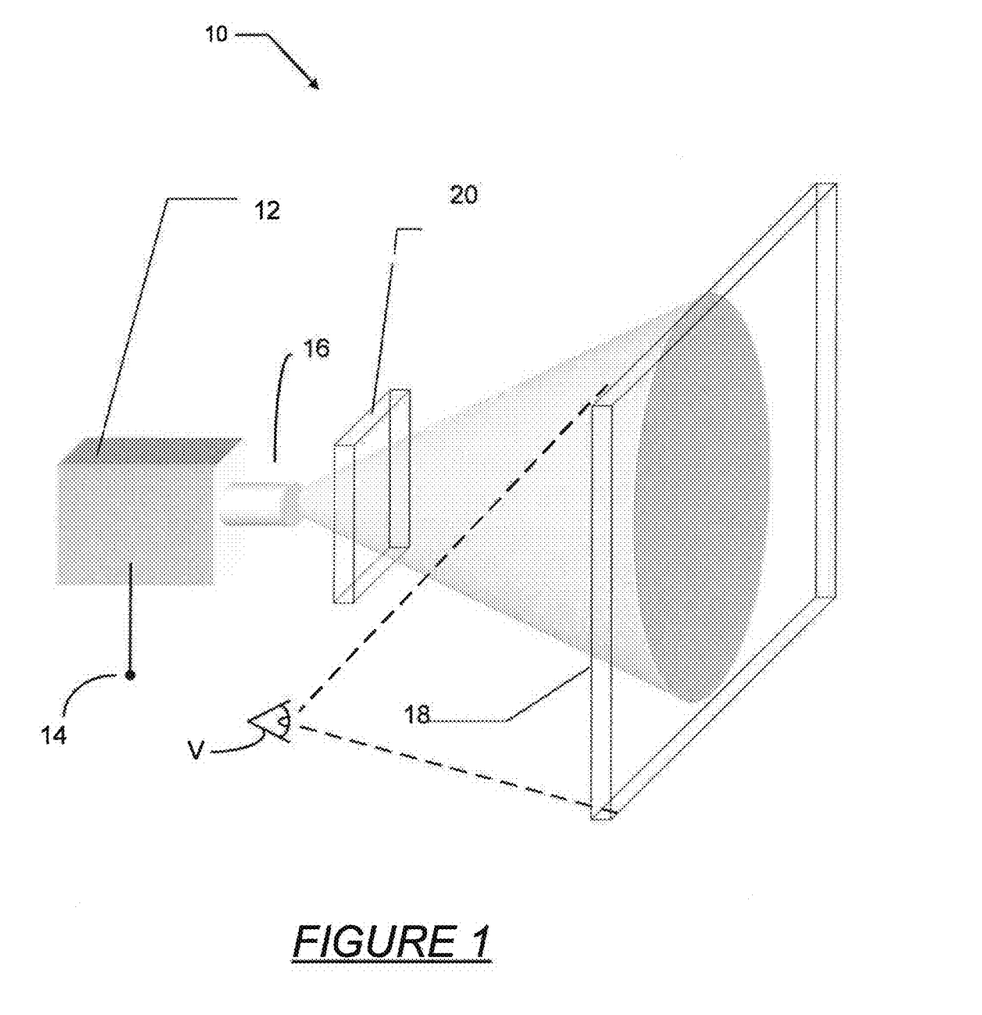
FIG. 1 is a schematic illustration of a projection display system according to an example embodiment.

FIG. 1 illustrates a projection system 10 according to a first example embodiment. System 10 comprises an image projector 12. Image projector 12 receives image data at an input 14 and projects light modulated according to the image data through a lens 16 for display on a screen 18. A viewer V can observe light that has interacted with screen 18. Screen 18 may comprise a reflective screen or a transmissive screen, for example. Some embodiments provide front-projection projector systems and some embodiments provide rear-projection projector systems. The illustrated embodiments shows a front-projection projector system.

A spatial light modulator 20 is provided between lens 16 and screen 18. Spatial light modulator 20 is operable to control the transmission of light from lens 16 to screen 18. Spatial light modulator 20 can be controlled so that different portions of spatial light modulator 20 transmit different proportions of the light incident thereon to screen 18. In some embodiments, spatial light modulator 20 comprises a number of distinct regions and a transmissivity of each of the regions is independently controllable. The regions may be arranged in an array and may comprise an array of cells or pixels, for example.

Spatial light modulator 20 may be of high or low resolution. Boundaries between different controllable regions may be sharp but in some embodiments the boundaries between adjacent controllable regions are blurred (e.g. the regions may overlap such that changes in transmissivity between adjacent regions occurs in a number of steps or a smooth continuum). Spatial light modulator 20 may be monochrome or color.

Spatial light modulator 20 may be located at a position such that the effect of any of its controllable regions is blurred at screen 18. The ideal distance between lens 16 and spatial modulator 20 is a function of the optics, particularly the aperture and focal length of lens 16 as well as the distance to and size of the screen 18. The blurring arising from the fact that spatial modulator 20 is not in a plane where the image being projected onto screen 18 is in focus helps make the controllable elements of spatial modulator 20 imperceptible to viewer V while allowing some local control over image brightness.

For many applications it is sufficient for spatial modulator 20 to provide low-resolution control over the brightness of an image on screen 18. Such low-resolution control can be sufficient to make large dark regions on screen 18 blacker than they could otherwise be due to lens flare and other effects.

Since spatial modulator 20 is between lens 16 and screen 18 rather than upstream from lens 16, spatial modulator can be used to compensate for scattering in lens 16 to at least some degree.

In some embodiments, spatial light modulator 20 has the property that it is capable of transmitting a relatively large portion of the light incident from projector 12 to screen 18. In some embodiments, a transmission coefficient T is given by:

$$T = \frac{I_T}{I_I} \quad (1)$$

where $I_I$ is the intensity of light incident on spatial light modulator 20 and $I_T$ is the intensity of light that is passed by spatial light modulator 20. In general T can be made to vary on a region-by-region basis (e.g. a pixel-by-pixel basis) by supplying appropriate control signals to spatial light modulator 20. In such embodiments, the maximum transmission coefficient $T_{MAX}$ may represent the maximum value of T for any allowed control signals (i.e. spatial light modulator 20 may pass up to $T_{MAX}$ of the light incident on it to screen 18). In some embodiments, $T_{MAX}$ exceeds ½. In some embodiments, $T_{MAX}$ exceeds 0.85 (i.e. in such embodiments spatial light modulator 20 may pass up to 85% or more of the light incident on it to screen 18).

Not all spatial light modulator technologies have the property of providing relatively large values for $T_{MAX}$. Spatial light modulator technologies that can provide values of $T_{MAX}$ well in excess of ½ include electrowetting (EW) modulators, dye-doped polymer-stabilized cholesteric texture ("PSCT") modulators, high-transmissivity light valves and some low-contrast liquid crystal displays.

In some embodiments spatial light modulator 20 comprises an electro-wetting modulator. In some embodiments spatial light modulator 20 comprises a dye-doped PSCT modulator. In some embodiments spatial light modulator 20 comprises another type of spatial light modulator having $T_{MAX}$ in excess of ½ such as a suitable liquid crystal modulator, a suitable array of optical valves or the like. One advantage of electro-wetting modulators is that such modulators do not require polarized light (as in the case of LCD modulators).

Where spatial modulator 20 is an LCD modulator or a modulator of another type that only passes polarized light then, for maximum optical efficiency, it is desirable that projector 16 be of a type that emits polarized light (for example, projector 16 may comprise an LCOS projector or may comprise a reflective polarizer in its optical path), or some means should be provided for recycling light that is not polarized in such a manner that it can pass through spatial modulator 20.

In some embodiments, the controllable regions of spatial light modulator 20 are larger than the resolution of projector 12 (i.e. projector 12 has an overall image resolution that is greater than that of spatial modulator 20).

The overall intra-frame contrast achievable by projection system 10 can be estimated by multiplying the native contrasts of projector 12 and spatial modulator 20. For example, where projector 12 has a contrast ratio of 100:1, and spatial modulator 20 has a contrast ratio of 100:1 the contrast ratio of projection system 10 can be as much as 10,000:1. The full contrast may not be achievable for all image content based on requirements of temporal stability and artifact minimization during motion sequences, depending largely of the difference of resolutions between projector 12 and spatial modulator 20.

In some cases, spatial light modulator 20 has a significantly smaller contrast ratio than does projector 12. For example, spatial light modulator 20 may comprise a transmissive panel having a contrast ratio of less than 100:1. For example, spatial light modulator 20 may have a contrast ratio of 15:1 or 10:1 or 2:1 in some embodiments. Even such small contrast ratios can be sufficient to provide meaningful improvements in the contrast ration of projection system 10, thus facilitating, inter alia greater maximum luminance without unacceptably high black levels.

Even in embodiments where spatial light modulator 20 has a relatively small contrast ratio, the effect of spatial light modulator 20 on the overall contrast ratio of projection system 10 may be quite significant. For example, consider the case where projector 12 has an intra-frame contrast ratio of 100:1 and spatial light modulator 20 has a contrast ratio of only 15:1. The contrast ratio of the overall projection system 10 may be as great as 1500:1 (achieved by suitably controlling both the image projected by projector 12 and the transmissivity of regions of spatial light modulator 20).

In some embodiments, spatial light modulator 20 is operated as a substantially transparent window which is darkened in specific regions to depress the luminance in the selected regions. The selected regions may, for example correspond to dark or black parts of the image so that the effect of darkening regions of spatial light modulator 20 is to depress the black level of projection system 10.

Figure 2:
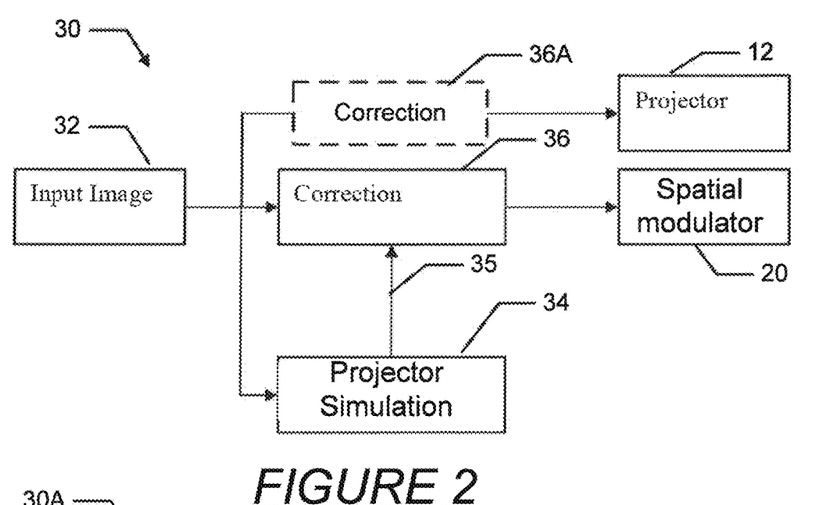
FIG. 2 is a block diagram of an example control system.

In the illustrated embodiment, spatial modulator 20 is located after lens 16. Thus, spatial modulator 20 may be used to compensate for flare in lens 16. FIG. 2 is a block diagram that illustrates one embodiment of a control system 30 for a projection system like projection system 10. Control system 30 receives image data 32 to be displayed. Image data 32 may, for example, comprise a still image, a file containing a video sequence, a video stream, an output from a graphics adapter or a media player or the like.

Image data 32 (after being decoded, if necessary, and after any desired preliminary image processing) is provided to drive projector 12 and also to a projector simulation 34. Projector simulation 34 computes an estimate 35 of the light that projector 10 will emit in response to the input of image data 32. In some embodiments, the estimate is determined in real-time on a frame-by frame basis. In some embodiments the estimate is determined for each frame. In some embodiments, the estimate is determined for a group of frames having similar image content. The estimate produced by projector simulation 34 may, for example, comprise a map of estimated luminance as a function of position. In some embodiments the estimate produced by projector simulation 34 is a map having the resolution of spatial modulator 20. This may be significantly lower than the resolution of the images projected by projector 12.

In some embodiments, projector simulation 34 applies methods and apparatus as described in PCT international application publication No. WO 2006/010244 entitled RAPID IMAGE RENDERING ON DUAL-MODULATOR DISPLAYS which is hereby incorporated herein by reference.

Projector simulation 34 applies a mathematical model of projector 12 including lens 16. The model preferably takes into account flare in lens 16. In some embodiments, the model determines the luminance of pixels of projector 12 when displaying an image as specified by image data 32, applies a point spread function to estimate spread of the light from the pixels at lens 16 and applies a model of lens 16 which includes scattering within lens 16 to estimate a distribution of light at spatial modulator 20 from the pixel in question. Application of the point spread function and the lens model may be performed separately or in a combined calculation. The amount of light incident at each pixel of an observable image projected onto screen 18 can then be estimated by summing contributions from the pixels of projector 16.

In some embodiments, projector simulation 34 operates by applying the point spread function and lens model to groups of pixels of projector 12. In such embodiments, projector simulation 34 may calculate an average luminance of a group of pixels of projector 12 (e.g. a set of pixels that will illuminate a small region on screen 18). One way to achieve this is to apply a model of the light source component of projector 12 to the values in image data 32 to yield an estimate of the luminance produced by pixels within projector 12, downsample the result, and apply the point spread function and lens model to the pixels of the downsampled result.

Projector simulation 34 may comprise filtering the input signal (image data 32) with a point spread function measured from projector 12 to simulate the resulting loss of contrast. The point spread function may be measured, for example, by turning on one pixel or group of pixels in projector 12 and measuring a distribution of light produced by the one pixel or group of pixels at screen 18 or at another plane or surface between lens 16 and screen 18. The point spread function indicates how light from one pixel or group of pixels of projector 12 becomes distributed as the light propagates through projector 12 including lens 16.

A correction system 36 compares the estimate prepared by projector simulation 34 to image data 32 and determines a correction to be applied by varying the transmissivities of controllable regions of spatial modulator 20. A correction factor may be determined, for example, by dividing the input image data by the estimate produced by projector simulation 34 (or multiplying by the reciprocal of the estimate produced by projector simulation 34). In areas where estimate 35 indicates a light level higher than that specified in the input image data the correction factor will be less than 1.0. A correction signal based on the correction factors determined by correction system 36 is connected to drive spatial modulator 20. For the regions in which the correction factor is less than 1.0, spatial modulator 20 is controlled to decrease the light passing to screen 18 by the indicated amount. For regions where the correction factor is 1.0 or more, the corresponding region(s) of spatial modulator 20 may be controlled to remain in their most highly transmissive (e.g. most transparent) states.

In some embodiments the control method is iterative. An optional correction system 36A modifies the image data delivered to projector 12 based on the estimate prepared by projector simulation 34, a model of the behavior of spatial modulator 20, the control signals driving spatial modulator 20 and image data 32. The adjustment may, for example, be determined by comparing image data 32 to an estimate of the image that would be displayed on screen 18 as a result of the modification of the light from projector 12 by spatial modulator 20. The image data driving projector 12 may be modified by correction system 36A so as to increase the brightness of pixels that are estimated to be dimmer than specified in the image data and to decrease the brightness of pixels that are estimated to be brighter than specified in the image data. In some embodiments modifications to image data driving projector 12 and control signals for spatial modulator 20 are refined over a number of successive iterations to provide improved compensation for flare in lens 16 and/or other imaging defects introduced by imperfections in the optical path to screen 18.

A control system may take into account a model of the component of lens flare which provides a general scattering that floods the whole screen 18 with scattered light. By shading regions of the projected image that are darker than the rest, the control system can reduce this scattered light. By doing so, the intensity of the light that is intended to be projected by projector 12 in darker areas of the image is also reduced. This can be compensated for by modifying image data 32 to increase the intensity of the image data corresponding to darker parts of the image to compensate for the dimming provided by spatial modulator 20.

Figure 3:
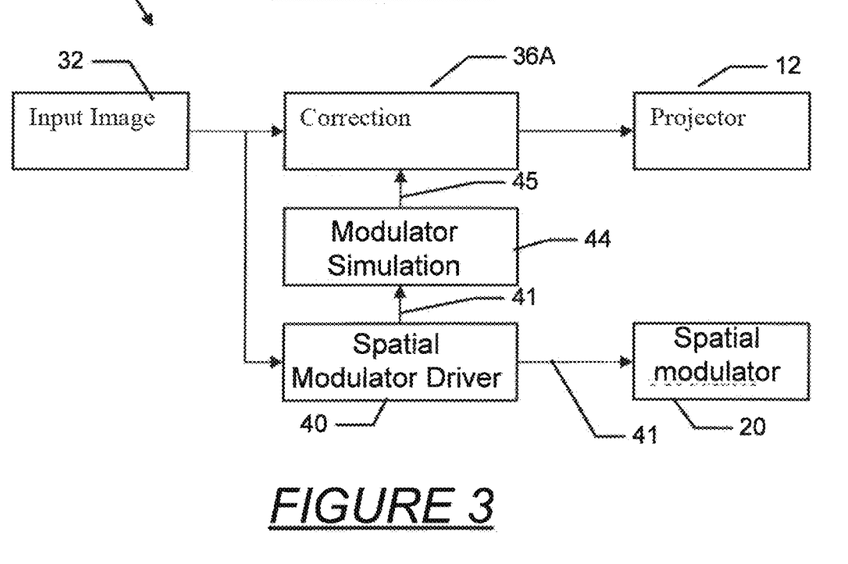
FIG. 3 is a block diagram of another example control system.

An alternative control arrangement 30A is illustrated in FIG. 3. Control arrangement 30A operates by determining driving values for spatial modulator 20 and then determining modified image data for driving projector 12. The modified image data takes into account the varying transmissivity of spatial modulator 20. In control system 30A, image data 32 is provided as an input to a spatial modulator driver 40. Spatial modulator driver 40 determines driving signals for spatial modulator 20 based on image data 32. For example spatial modulator driver 40 may extract or calculate a monochrome (luminance) version of image data 32.

The luminance image may be downsampled to a resolution matching that of spatial modulator 20. Driving signals 41 for elements of spatial modulator 20 may be arrived at in various ways such as: taking a weighted summation of input values; calculating a weighted combination of maximum and mean of each region of an image; downsampling the image; and the like. Preparing driving signals 41 may comprise smoothing image data 32 by applying a filter kernel (Gaussian or otherwise).

Driving signals 41 are also provided to a modulator simulation 44 which comprises a model of the effect of spatial modulator 20 on light from projector 12. Modulator simulation 44 may provide as an output a map 45 that specifies how much of the light generated by projector 12 for each image pixel is estimated to reach screen 18 for the case where spatial modulator 20 is driven by driving signals 41. In this case, modulator simulation 44 may comprise a model of spatial modulator 20 and a point spread function that describes the spreading of light from pixels of projector 12 as that light passes through projector 12 including lens 16 and spatial modulator 20 to screen 18.

Correction system 36A then divides image data 32 by the corresponding values in map 45 to obtain modified image data 32A for driving projector 12 to achieve an improved display of the image(s) of image data 32 on screen 18.

A control arrangement like arrangement 30A may also be configured to determine driving signals 41 and modified image data 32A iteratively through two or more iterations.

In some embodiments, a control system operates by passing image data 32 through a filter that simulates the blur of the optical system of projector 12 (including lens 16). The filter may be designed based on measurements of test patterns projected by projector 12 or estimated based on the design of projector 12 and lens 16. The filtered image represents the flare that it is desired to remove. The flare may be removed by one or both of subtracting the predicted flare (or the predicted flare multiplied by a weighting factor) from the input image and increasing the absorption of parts of spatial modulator 20 that correspond to darker regions of the image while increasing the intensity of the image data in those darker regions to compensate for the effect of spatial modulator 20. The change to the image data affects the predicted flare. Consequently the process may be iterated until sufficient compensation for flare in lens 16 has been achieved.

In an alternative control arrangement, modified image data 32A and driving signals 41 are each derived directly from image data 32. For example, driving signals 41 may be determined by downsampling and/or filtering image data 32, identifying high-brightness areas in image data 32 having an average brightness exceeding a threshold and setting control signals 41 to cause spatial modulator 20 to dim areas surrounding the high brightness areas according to a dimming function. Modified image data 32A may be generated by boosting slightly the pixel values (or boosting the brightest pixel values or pixel values exceeding a threshold) for pixels in areas outside of the high-brightness areas.

In an alternative control arrangement, modified image data 32A and driving signals 41 are each initially derived directly from image data 32 and are then iteratively refined as described above, for example.

Lens 16 may be adjustable. For example, lens 16 may comprise a zoom lens or a lens that provides adjustment for barrel distortions or the like. In such case the setting of the lens will affect lens flare and other characteristics of the point spread function for light passing through lens 16. Where lens 16 is adjustable, a projector simulator 34 or a modulator simulator 44 may be configured for a specific setting of lens 16. For example, lens 16 may be adjusted to a desired setting and then a calibration may be performed. Performing the calibration may comprise, for example, projecting light using a pixel or a small group of pixels of projector 12 and monitoring the resulting distribution of light at screen 18 or spatial modulator 20 or another convenient surface. Calibration information based on the resulting distribution of light may then be used to configure projector simulator 34 or modulator simulator 44.

In other embodiments, a control system contains calibration information for multiple settings of lens 16 and receives a signal indicative of a zoom level and/or one or more other settings of lens 16. Based on the signal the control system selects an appropriate set of calibration information and applies that calibration information in controlling projector 12 and/or spatial modulator 16.

An advantage of some embodiments is that projector 12 may comprise any suitable projector. For example, projector 12 may be any commercially available projector that is suited for the intended application. Such projectors 12 may be used with no modifications in some embodiments. A retrofit system may comprise, for example a control box having a first connector for connecting an incoming video signal carrying video data 32 to be displayed and a second connector for connecting to a video input of a projector 12 and a spatial modulator 20 connectable to be controlled by the control box. The retrofit system may be set up by finding an optimal placement for spatial modulator 20 (i.e. a location such that modulator 20 is close enough to lens 16 to modulate light over the entire screen 18 and is close enough to screen 18 to provide adequate local control of brightness. The control box may then be configured to control spatial modulator 20 to compensate for flare in lens 16 in a tuning or calibration step.

Control systems 30 and 30A may be implemented in hardware, software (including 'firmware') or suitable combinations of hardware and software. Certain implementations of the invention comprise computer processors which execute software instructions which cause the processors to perform a method of the invention. For example, one or more processors in a projection system may perform methods as described above for generating driving signals for a spatial modulator 20 and a projector 12 by executing software instructions in a program memory accessible to the processors that manipulate image data and models of the optical system of the projector and/or spatial modulator. For example, such image processing may be performed by a data processor (such as one or more microprocessors, graphics processors, digital signal processors or the like) executing software and/or firmware instructions which cause the data processor to implement methods as described herein. The software and other modules described herein may be executed by a general-purpose computer, e.g., a server computer or personal computer. Furthermore, aspects of the system can be embodied in a special purpose computer or data processor that is specifically programmed, configured, or constructed to perform methods as explained herein.

Instead or in addition to programmable data processors, control systems 30 and 30A may comprise logic circuits which may be hard configured or configurable (such as, for example logic circuits provided by a field-programmable gate array "FPGA").

The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, media such as magnetic data storage media including floppy diskettes, hard disk drives, optical data storage media including CD ROMs, DVDs, electronic data storage media including ROMs, flash RAM, hardwired or preprogrammed chips (e.g., EEPROM semiconductor chips), nanotechnology memory, or the like. The computer-readable signals on the program product may optionally be compressed or encrypted. Computer instructions, data structures, and other data used in the practice of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

One application to which the invention may be applied to advantage is providing projection systems for use in projecting 3D images. Such systems may include a polarization control panel that can be controlled to create a 3D image by sequentially switching the polarization between two orthogonal polarizations associated with corresponding lenses of a viewer's glasses. In such a system different images may be displayed to a viewer's right and left eyes creating a stereoscopic effect. An example polarization control panel is described in US2011/032345A1 which is hereby incorporated herein by reference. Suitable polarization control panels are commercially produced by RealID Inc. of Beverly Hills, Calif., United States of America.

Figure 4:
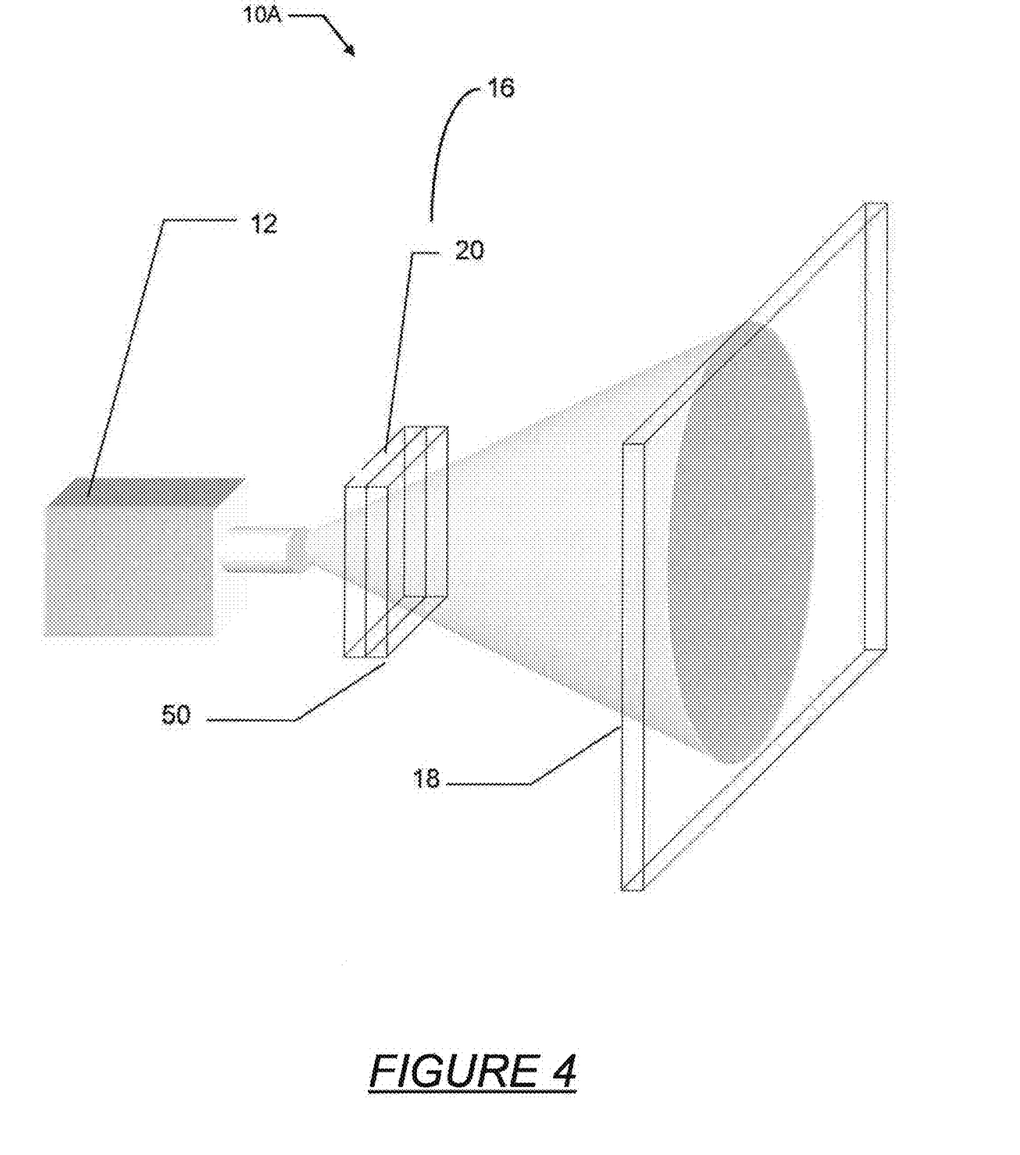
FIG. 4 is a schematic illustration of a 3D projection display system according to another example embodiment.

FIG. 4 shows an example projection system 10A according to an embodiment which includes a polarization control panel 50 capable of switching polarization between two states corresponding to images for viewing respectively by viewers' left and right eyes. A controller (not shown in FIG. 4) controls projector 12 to project left and right images for viewing by viewers' left and right eyes in alternation and to switch the polarization of polarization control panel 50 in time with the projection of the images such that left eye images are polarized one way and right eye images are polarized in another way.

In the embodiment of FIG. 4 spatial modulator 20 may conveniently be a polarizing modulator arranged such that an output polarization of spatial modulator 20 is aligned with the input polarization of polarization control panel 50. In some embodiments spatial modulator 20 serves the dual roles of modulating brightness to compensate for lens flare and switching polarization between left and right eye projections. Spatial modulator 20 may be configured to control brightness by rotating polarization in one sense during display of a left eye image and rotating polarization in another sense during display of a right eye image.

Spatial modulator 20 is a reflective modulator in some embodiments. In such embodiments a light transmission path from lens 16 to screen 18 may be folded. Spatial light modulator 20 may be flat but is not necessarily flat. Spatial light modulator 20 is curved in some embodiments. Spatial modulator 20 may be but is not necessarily parallel to screen 18. Spatial light modulator is tilted relative to screen 18 in some embodiments.

Where a component (e.g. a display, spatial modulator, projector, model, lens, software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The technology provided herein can be applied to systems other than the example systems described above. The elements and acts of the various examples described above can be combined to provide further examples.

From the foregoing, it will be appreciated that specific examples of systems and methods have been described herein for purposes of illustration, but that various modifications may be made without deviating from the spirit and scope of the invention. Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

What is claimed is:

1. A projector, comprising:
   a first modulation device of a first type configured to produce a first type of modulation causing a variable pattern of intensities on a second modulation device of a second type and and configured to spatially modulate intensities of the modulated light;
   wherein the first modulation device comprises a phase modulator and the second modulator comprises an amplitude modulator;
   a controller comprising a light distribution model configured to model the variable pattern of intensities on the second modulation device based on a simulation that operates with respect to groups of pixels of the first modulation device to determine how they will illuminate a region of the image, and a correction mechanism configured to determine amplitude settings of the second modulator.

2. The projector according to claim 1, wherein the correction mechanism includes compensation for a lensing artifact contained the distribution of light on the second modulator.

3. The projector according to claim 1, wherein the first modulation device comprises a Liquid Crystal on Silicon (LCoS) projection device.

4. The projector according to claim 3, wherein the projector is part of a projection system that projects separate images having different qualities onto a screen for viewing by a viewer wherein the separate images of different qualities combine to form an image intended to be perceived by the viewer.

5. The projector according to claim 4, wherein one of the images comprises a low resolution image different from the other image which comprises a higher resolution image.

6. The projector according to claim 1, wherein resolutions and contrast of the first and second modulators are not the same.

7. The projector according to claim 6, wherein the first image comprises an image data frame in a first state and the second image comprises the image data frame in a second state.

8. The projector according to claim 1, wherein the first modulation device creates a portion of an image to be projected at an increased overbrightness greater than that called for in corresponding image data and the subsequent modulation device corrects for the overbrightness to the level called for in the corresponding image data.

9. The projector according to claim 8, wherein the controller is configured to utilize a point spread function and modeling to determine a brightness at the second modulation device and utilize the brightness at the second modulation device to determine an amount of modulation performed by the second modulation device to produce a projected image specified by the image data.

10. The projector according to claim 9, wherein the projector projects images at higher contrast than a similarly equipped projector without the spatial modulator of the second modulation device.

11. The projector according to claim 10, wherein the projector is part of a projection system that projects separate images onto a screen for viewing by a user wherein the separate images combine to form an image intended to be perceived by the viewer.

12. The projector according to claim 11, wherein qualities of the separate images are different.

13. The projector according to claim 12, wherein one of the images comprises a low resolution image different from the other image which comprises a higher resolution image.

14. The projector according to claim 11, wherein the first image comprises an image data frame in a first state and the second image comprises the image data frame in a second state.

15. The projector according to claim 14, wherein the first state comprises a first polarization state and the first image comprises a first channel of a 3D image specified by the image data.

16. The projector according to claim 14, wherein the first state comprises first qualities of an image including spatial resolution different from corresponding qualities and spatial resolution of an image of the second state.

17. The projector according to claim 16, wherein the projector is configured to project at least part of a 3D image specified by the image data.

18. A controller configured to control a first modulation mechanism and a second modulation mechanism to modulate 3D imagery specified by image data wherein at least one of the modulators is combined with a polarization control device and wherein the second modulation mechanism is configured to further modulate light in an image chain comprising pixels simulated and acting together to illuminate a region of the second modulator where the simulation is used to determine modulation values of the second modulator and wherein said modulation produce a first state image that in combination with a second state image is intended to display an image to be perceived by a viewer and wherein the controller comprises a model and lens model and configured to estimate a distribution of light comprising darkened and lighter areas incident on the subsequent modulation device from the pixels acting together and use the estimated distribution and image data to energize the subsequent modulation device; and further wherein the controller energizes the subsequent modulation device to compensate for an artifact contained the distribution of light on the subsequent modulator.

19. The controller according to claim 18, wherein the first state image has different qualities than the second state image.

20. The controller according to claim 19, wherein the first state image comprises a first channel of the 3D image.

* * * * *